United States Patent
Cinnamon et al.

(10) Patent No.: US 10,581,371 B2
(45) Date of Patent: Mar. 3, 2020

(54) SOLAR PANEL MECHANICAL CONNECTOR AND FRAME

(71) Applicant: Spice Solar, Inc., Campbell, CA (US)

(72) Inventors: Barry Cinnamon, Saratoga, CA (US); Wilson Leong, San Carlos, CA (US); David Baker, Capitola, CA (US)

(73) Assignee: SPICE SOLAR, INC., Campbell, CA (US)

( * ) Notice: Subject to any disclaimer, the term of this patent is extended or adjusted under 35 U.S.C. 154(b) by 0 days.

(21) Appl. No.: 14/956,801

(22) Filed: Dec. 2, 2015

(65) Prior Publication Data
US 2016/0087578 A1    Mar. 24, 2016

Related U.S. Application Data

(63) Continuation of application No. 14/059,190, filed on Oct. 21, 2013, now Pat. No. 9,231,518.

(51) Int. Cl.
*H02S 30/10* (2014.01)
*H02S 40/36* (2014.01)

(52) U.S. Cl.
CPC ............ *H02S 30/10* (2014.12); *H02S 40/36* (2014.12); *Y10T 29/49208* (2015.01); *Y10T 29/49815* (2015.01); *Y10T 29/49947* (2015.01)

(58) Field of Classification Search
CPC ...................................................... H02S 30/10
See application file for complete search history.

(56) References Cited

U.S. PATENT DOCUMENTS

| | | | |
|---|---|---|---|
| 7,888,591 B2 * | 2/2011 | Naum | H01L 31/028 136/243 |
| 2007/0251567 A1 | 11/2007 | Plaisted | |
| 2009/0078299 A1 * | 3/2009 | Cinnamon | F24J 2/5211 136/244 |

(Continued)

FOREIGN PATENT DOCUMENTS

| | | |
|---|---|---|
| CN | 101868860 A | 10/2010 |
| JP | 2002141541 | 5/2002 |
| JP | 2008506057 | 2/2008 |

*Primary Examiner* — Daniel P Malley, Jr.
(74) *Attorney, Agent, or Firm* — David R. Stevens; Stevens Law Group

(57) ABSTRACT

A design is described for solar panel that allows for modular installation and efficient removal of panels irrespective of the panel's relative location in an array arrangement. A system is provided that includes a plurality of modular panels (such as solar power panels). These panels are rimmed by frames featuring one or more exterior-facing, grooved channels. A first channel—which may be used to mount the panel, and which replaces traditional railing installation systems—and a second channel that is configured to allow movement of one or more panel splices used to secure the panels together. Integrated electrical connection interfaces are provided on opposite side surfaces of the frames to couple with the electrical connection interfaces of adjacent panels to establish an electrical path between them. A spacer component may be inserted between panels to provide access to the electrical connection interfaces; support and rigidity to the joined panels; a grounding path between the panels; and, when combined with the panel splices, to align the panels to prevent damage to the electrical connection interfaces.

13 Claims, 11 Drawing Sheets

(56) References Cited

U.S. PATENT DOCUMENTS

| 2010/0147362 | A1  | 6/2010 | King et al. | |
| 2010/0180933 | A1* | 7/2010 | Aftanas | F24J 2/5211 |
| | | | | 136/251 |
| 2011/0000520 | A1* | 1/2011 | West | F24J 2/5211 |
| | | | | 136/244 |
| 2012/0125410 | A1* | 5/2012 | West | H02S 20/23 |
| | | | | 136/251 |

* cited by examiner

1100

SOLAR PANEL MECHANICAL CONNECTOR AND FRAME

RELATED APPLICATION

This application is a continuation of U.S. application Ser. No. 14/059,190, entitled "Solar Panel Mechanical Connector and Frame", filed Oct. 21, 2013, the disclosure which is incorporated by reference herein in its entirety.

BACKGROUND

Recently, concerns over the long-term availability and pollutive effects of traditional energy sources like coal, natural gas, and nuclear power has led to increased interest and development of renewable energy sources. Even more recently, renewable energy sources, which include hydroelectric, wind, solar, geothermal and biomass have been introduced as supplements to traditional energy sources in major business and industry sectors. In some instances, solar powered energy sources have even become the primary energy source for some residences.

Typically, solar power generation for residential establishments involve installing large solar panels on rooftops. These solar panels absorb the solar radiation and convert the absorbed energy into electricity which can be used to power the residence. However, installation of these panels can be complex and/or difficult due to their size. Generally, a mounting system is first installed, and secured against specific locations (e.g., against rafters). A series of rails are then put in place in the mounting system (typically in a grid-like arrangement). The solar panels themselves are then securely affixed to the rails and, eventually, to neighboring panels via mechanical and/or electrical connectors.

However, the railing system presents additional expenditures due to materials and transport costs of the rails themselves. As a solution to this, solar panels were developed that were capable of being installed directly to mounting systems without the need for rails. In order to maintain the same stability and security, the solar panels are mechanically affixed to each other (typically in series), using a mechanical connectors, sometimes implemented as cylindrical rods or trapezoidal beams. Generally, these connectors consist of rigid, threaded connectors, often positioned in short tunnels within the interiors of frames of two neighboring rectangular panels. The connectors are inserted into a first panel, and then to a second panel on the opposite end of the splice. Initially, the connectors protrude into each panel insecurely. Subsequently, the connectors may be manually tightened to both panels—often in a user-intensive process—which increases the rigidity of the connection. However, according to such a solution, the connectors are generally very difficult to access while the panels are in position.

Thus, while obviating the requirement for rails, this solution presents significant problems of its own. Specifically, panel removal can become exceedingly difficult, particularly in the case of "middle" or non-end panels in a grid or panel array. Since there is generally only a small amount of space between neighboring panels, there is often insufficient clearance to completely disengage a splice from the panel to be removed. Moreover, specialized tools are commonly required to insert the splices or other connectors. As such, removal of a specific target panel may actually require the initial removal of several intervening panels in the same row or column (or other orientation). Naturally, this is both an inefficient and extremely time consuming process.

Another conventional solution has been proposed that positions the connectors along the exterior of the frame, with the connectors being capable of being moved along the perimeter in a single grooved channel. However, the channel is also used to affix each panel to mounting points of the mounting system. Thus, movement of the connectors is limited to the lengths of the frames between mounting points. The limited mobility can present problems during removal themselves.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

In the following embodiments, a design is described for solar panel that allows for modular installation and efficient removal of panels irrespective of the panel's relative location in an array arrangement. A system is provided that includes a plurality of modular panels (such as solar power panels). These panels are rimmed by frames featuring one or more exterior-facing, grooved channels. A first channel—which may be used to mount the panel, and which replaces traditional railing installation systems—and a second channel that is configured to allow movement of one or more panel splices used to secure the panels together. Integrated electrical connection interfaces are provided on opposite side surfaces of the frames to couple with the electrical connection interfaces of adjacent panels to establish an electrical path between them. A spacer component may be inserted between panels to provide access to the electrical connection interfaces; support and rigidity to the joined panels; a grounding path between the panels; and, when combined with the panel splices, to align the panels to prevent damage to the electrical connection interfaces.

According to another embodiment of the present invention, a method is provided to install a series of modular panels. According to such an embodiment, splices can be used to secure panels together by sliding the splice into a proper position along the exterior of two panel frames. For example, the splice may extend in substantially equal proportion into each of the second channels for the two adjoining panels. Once the splice is properly positioned, the splice can be affixed into to each frame (via a bolt or screw for example) to provide additional security and stability. In one or more embodiments, the splice may also be positioned through a channel of a spacer, aligned against the exterior of the two frames and inserted in between.

According to yet another embodiment, a method is provided to remove a modular panel. According to such an embodiment, a securing splice may be disengaged from a frame (by reversing the securing means, for example). Once unsecured, the splice may be slid into position away from the panel to be removed, e.g., to be entirely or substantially entirely deeper into the second channel of a neighboring panel. This process may be performed for each splice used to secure the target panel. Once the splices are repositioned, an electrical connector which may have been used to electrically couple the panel with adjacent panels is also disengaged, whereupon the panel may be lifted up and removed, without readjusting the position of its neighboring panels.

BRIEF DESCRIPTION OF DRAWINGS

The accompanying drawings, which are incorporated in and form a part of this specification, illustrate embodiments of the invention and, together with the description, serve to explain the principles of the invention.

DETAILED DESCRIPTION

Figure 1:
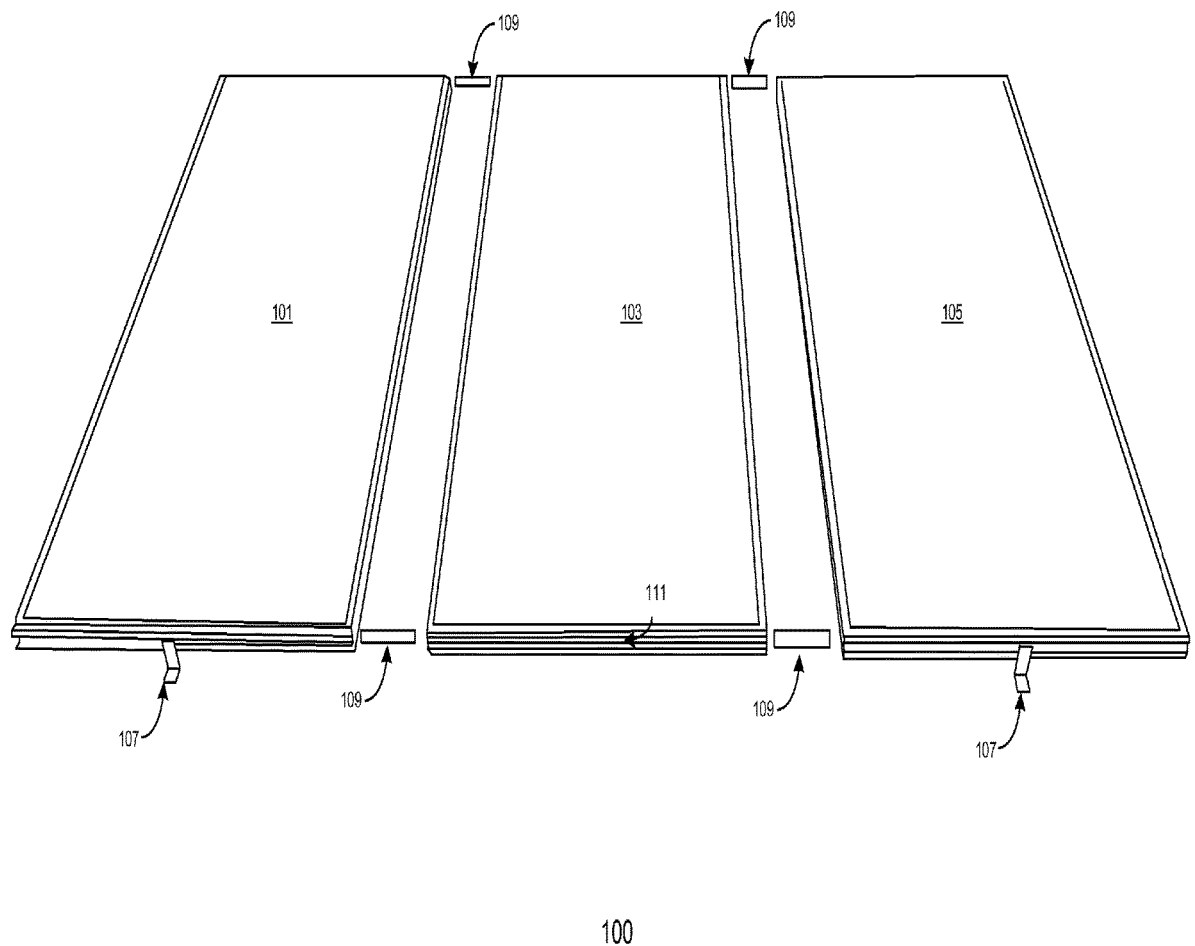
FIG. 1 depicts an exemplary system for coupling a plurality of solar panels, in accordance with various embodiments of the claimed subject matter.

Reference will now be made in detail to the various embodiments of the present disclosure, examples of which are illustrated in the accompanying drawings. While described in conjunction with these embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention can be practiced without these specific details. In other instances, well-known features have not been described in detail to avoid unnecessarily complicating the description.

In the following embodiments, an embodiment is described for an approach to modular solar panel installation and removal that provides quick and efficient removal while maintaining stability and security during operation.

As depicted in FIG. 1, an exemplary system 100 is depicted for coupling a plurality of rectangular solar collecting panels, in accordance with various embodiments of the claimed subject matter. In one or more embodiments, the plurality of panels (e.g., panels 101, 103, and 105) may include solar panels, each being implemented as one or more solar cells. Composition of the solar cells may vary according to various implementation, and may include (but are not limited to): crystalline-silicon solar cells, thin-film solar cells, amorphous-silicon solar cells, or a combination of two or more compositions, for example. The panels may be electrical solar panels in one embodiment.

In one or more embodiments, the solar panels (101, 103, 105) may be mounted to a roof, other relatively flat surface, or open structures such as a carport or ground-mounted array. Mounting may be performed by affixing portions of a panel (e.g., a panel frame) to mounting points 107. The mounting points 107 may be implemented as hinges or other vertical outcroppings and configured to be fastened to a mounting system installed (typically with a flashing) into the roof. In one embodiment, mounting points 107 may be positioned to correspond to the location of rafters or other secured points in a building or establishment. As shown in FIG. 1, the perimeter of each panel includes one or more channels 111. These channels can, in various embodiments, be implemented as grooves along entire (or substantial portions of) lengths of the exterior surface of the panel's frame, allowing for the free movement and positioning of elements within the channels. The channels may themselves be disposed along any of a side, top, or bottom surface of the frame, or a combination of surfaces. In one or more embodiments, panel splices 109 may be freely positioned along the channels on opposite sides of two or more adjacent panels, to provide rigidity, panel alignment, and a grounding path between panels. According to further embodiments, a separate channel or groove may be used to position the mounting point 107 at the designed location.

Exemplary Panel Configuration

As depicted in FIG. 1, three solar panels (101, 103, 105) are arranged in series according to a horizontal configuration. Such a configuration is purely exemplary, and it is to be understood that embodiments of the claimed subject matter are well suited to varying configurations and orientations. Panels may be configured in arrays in one (a row of panels) or two (a grid of panels) dimensions, for example.

Exemplary Frame Configurations

Figure 2:
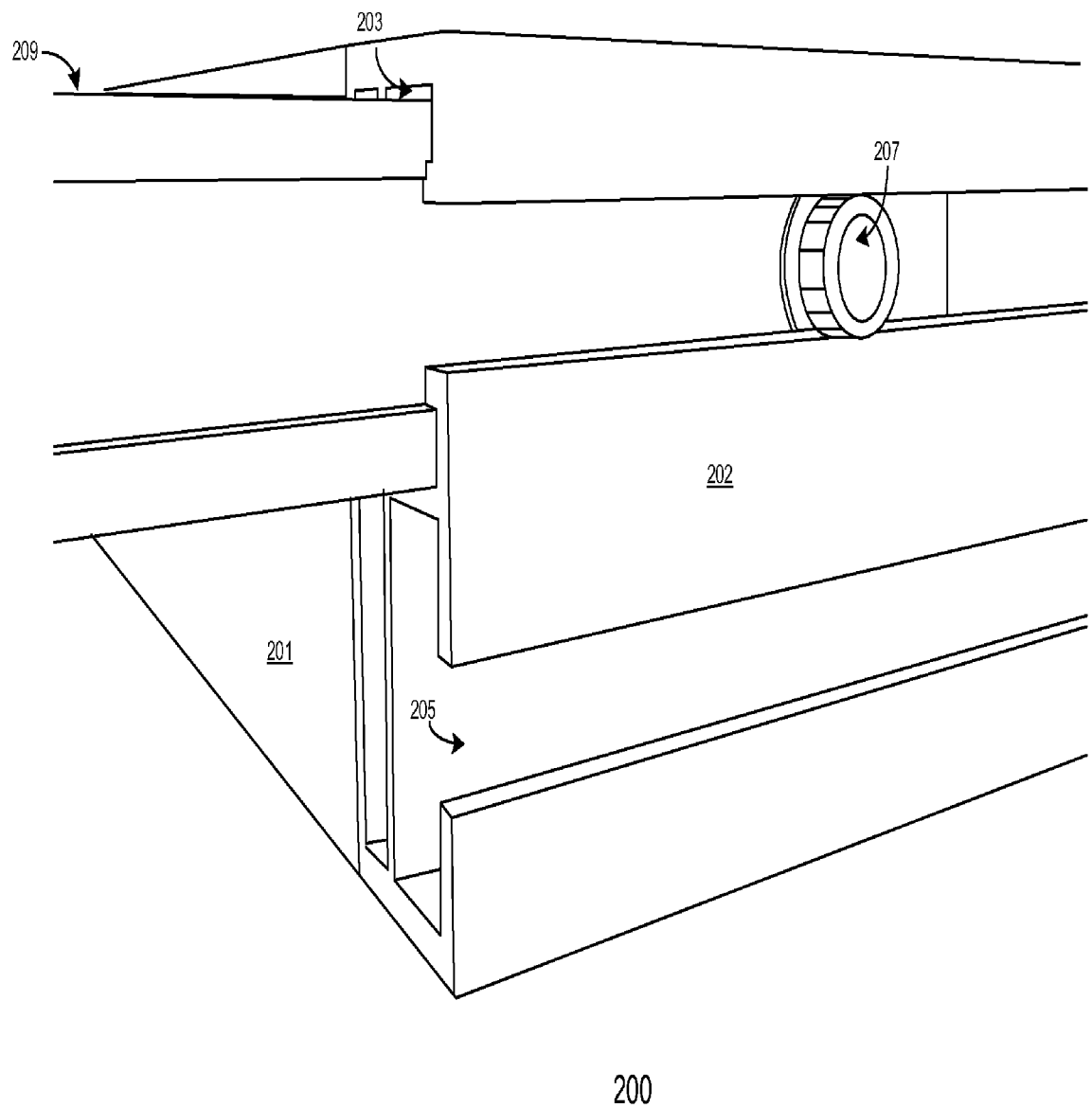
FIG. 2 depicts an exemplary configuration of a panel frame and panel splice, in accordance with various embodiments of the claimed subject matter.

As depicted in FIG. 2, an exemplary configuration 200 of a panel splice and frame is depicted, in accordance with various embodiments of the claimed subject matter. FIG. 2 depicts a cross-section of a panel 201. The panel 201 includes a frame 202. As depicted, the frame includes a first channel 203, and a second channel 205. As shown in FIG. 2, the first channel 203 may be used as a connection channel, and used to allow panel splices 209 to move along the channel into position to mechanically couple the panel to an adjacent panel, and/or out of position in order to decouple a pair of adjacent panels, for example. The second channel may be used to position a mounting point (e.g., mounting point 107 of FIG. 1). According to further embodiments, the second channel can also be used to secure, or allow the movement and/or passage of various channel accessories. These channel accessories may include, for example, a series of cable clips fastening a plurality of cables together; an extra splice to reinforce or support a coupling of two adjacent panels; an electrical box, solar optimizer, micro inverter attachment, safety device, or performance enhancement device used during the process to convert absorbed solar energy into electricity, etc.

As depicted in FIG. 2, panel splice 209 is shaped as a ridged bar. Panel splice 209 may be composed of metal, or any other high density and/or rigid composition capable of supporting the weight of two adjacent solar panels. While depicted as a ridged bar in FIG. 2, panel splice 209 may be variously shaped, according to different embodiments. For example, panel splice 209 may also be shaped as a plate, rod, slider, beam, bolt, or other composition with a substantially straight profile. In alternate embodiments, the panel splice 209 may be shaped with a (slight) arched profile, such that the top of the arch crests at a location between two adjacent panels, and increasing the support provided by the splice 209. In still further embodiments, the splice 209 may be shaped as any number of polyhedrons, not specifically limited to cylinders (rods). For example, embodiments may be well suited for implementations that impart a trapezoidal polyhedron shape to the panel splice 209.

Also as depicted in FIG. 2, panel splice 209 may be fastened at a position in the channel and the frame using a fastening mechanism 207. Fastening the panel splice 209 to the frame may be performed by adjusting a fastening mechanism 207 in an aperture through the panel splice 209. The fastening mechanism 207 may be implemented in a variety of manners, including, but not limited to: a bolt; a cam, a screw; an interference fit fastener; a threaded fastener; a tapered threaded fastener; a cone-threaded fastener; a ball-tipped fastener; a spring-loaded fastener; a pin; and a tapered spring fastener; or any other device that may be inserted through an aperture in the splice 209 and adjusted until movement of the splice is substantially prevented.

In one or more embodiments, the panel splice 209 may include multiple apertures, either implemented as complete through-holes, or raised ridges (or depressions) that correspond to similar structures or protrusions on one or more surfaces of the channel that assists in the guidance of the panel splice 209 into proper positioning. Alternately, a spring pin in the splice 209 and a corresponding pin hole in the interior surface of the channel can be implemented and used as an indication when the splice 209 is properly positioned. In further embodiments, the spring pin, when positioned within the pin hole also is configured to secure the splice in place. While FIG. 2 depicts a fastening device 207 being inserted through an aperture in a side surface of the splice 209, according to alternate embodiments, the aperture for fastening the splice 209 may be located on a top surface, and fastening the aperture to the frame or a spacer component (described below) may be performed from a position above the panel 201 and splice 209.

Figure 3:
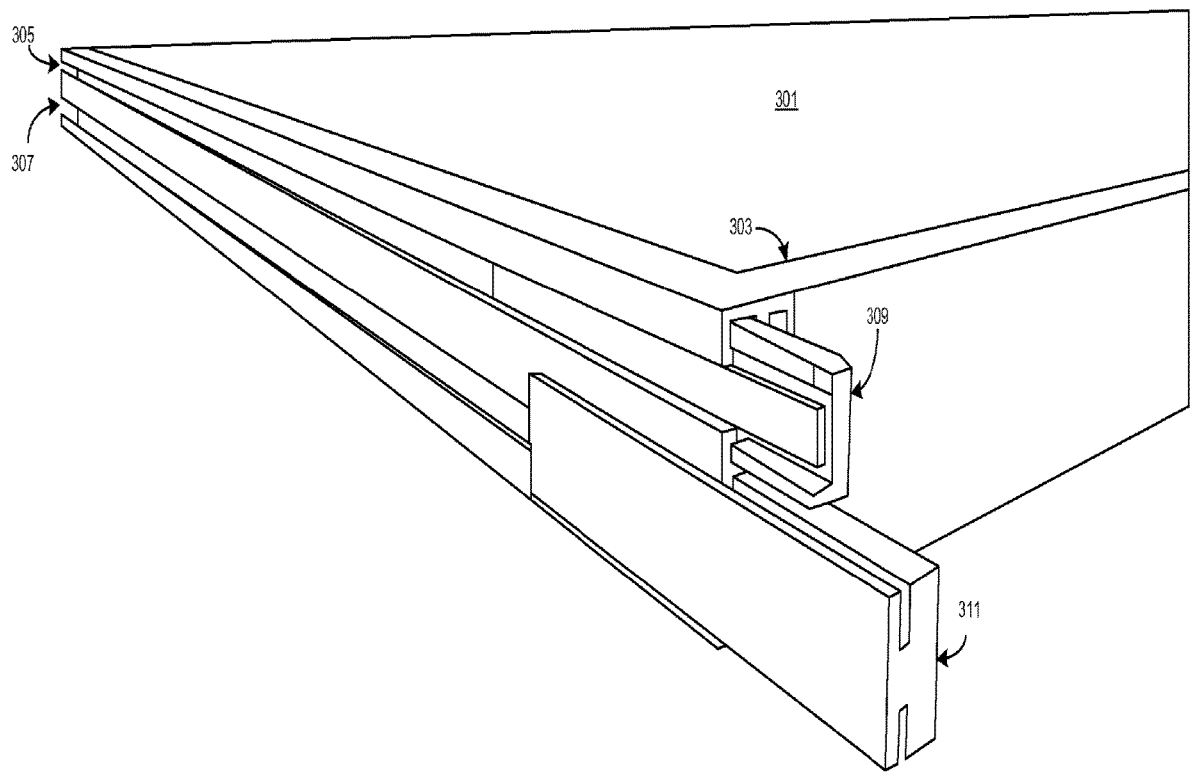
FIG. 3 depicts an exemplary configuration of a solar panel with a pair of panel splices, in accordance with various embodiments of the claimed subject matter.

FIG. 3 depicts an exemplary configuration 300 of a panel 301 with a pair of panel splices (splices 309, 311), in accordance with various embodiments of the claimed subject matter. Panel 301 is depicted with an encircling frame 303 that includes two channels, channels 305, 307. Each channel is fitted to secure the movement of corresponding panel splices 309, 311. As shown in FIG. 3, a first panel splice 309 is operable to travel the length of the top channel 305, along the interior of the channel 305. A second panel splice 311 is operable to travel the length of the bottom channel 307, with a surface on an exterior of the channel 307 (and frame 303 itself). A dual splice system may be used to provide additional load-bearing support or rigidity, for example.

In one or more embodiments, one or more of the splices may also be equipped with one or more friction-reducing elements, so as to allow smoother movement along a channel. The friction-reducing element may be one of several possible implementations that include, but are not limited to: a surface finish; a surface coating; a surface plating; a plurality of surface grooves to reduce contact with channel surfaces; a plurality of other raised elements (e.g., bumps); embossing; encasing in a low-friction polymer; adhesion to a low-friction tape, etc.

Figure 4A:
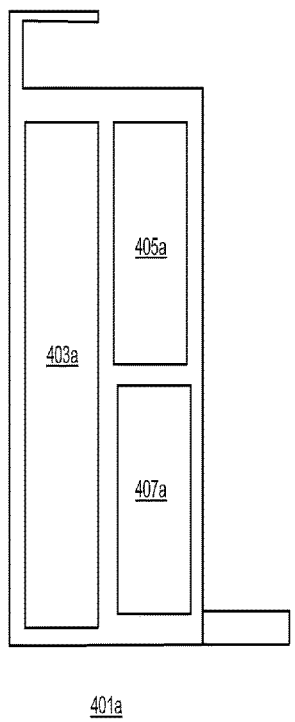
FIG. 4a depicts a cross-section of an exemplary panel frame with three channels, in accordance with various embodiments of the claimed subject matter.
Figure 4B:
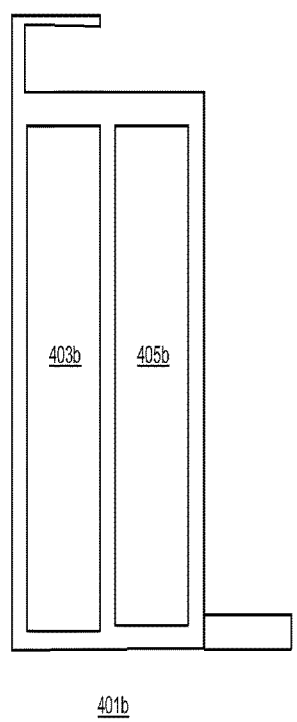
FIG. 4b depicts a cross-section of an exemplary panel frame with two channels, in accordance with various embodiments of the claimed subject matter.
Figure 4C:
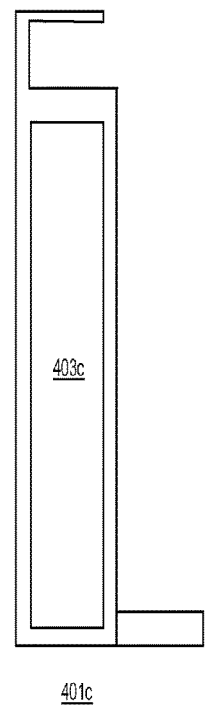
FIG. 4c depicts a cross-section of an exemplary panel frame with one channel, in accordance with various embodiments of the claimed subject matter.

FIGS. 4a-4c depict cross-sections of varying exemplary panel frames, in accordance with various embodiments of the claimed subject matter. FIG. 4a depicts a cross-section of an exemplary panel frame 401a with three channels (403a, 405a, 407a). FIG. 4b depicts a cross-section of an exemplary panel frame 401b with two channels (403b, 405b). FIG. 4c depicts a cross-section of an exemplary panel frame 401c with one channel (403c), in accordance with various embodiments of the claimed subject matter. As described above with respect to FIGS. 1-3, one or more of the channels in each frame (401a, 401b, 401c) may be used to transport, or position, one or more module splices to a location between two adjacent panels to provide structure, support, and a grounding path. Remaining, unoccupied channels may be used for various purposes as described herein.

Figure 5:
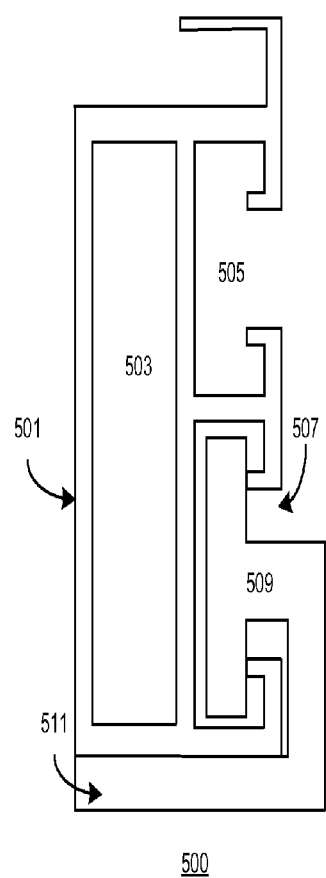
FIG. 5 depicts a cross-section of an exemplary panel frame and panel splice with a shelf configuration, in accordance with various embodiments of the claimed subject matter.

As depicted in FIG. 5, a cross-section 500 of an exemplary panel frame 501 and panel splice 509 is depicted with a shelf configuration 511, in accordance with various embodiments of the claimed subject matter. As shown in FIG. 5, the panel frame consists of three channels, one closed channel 503, and two exterior facing open channels 505, 507. A panel splice 509, depicted in FIG. 5 to include a shelf 511 may be inserted—at a corner of the panel frame 501, for example—into the lower channel 507. Subsequently, the panel splice 509 may be moved along the channel 507 until a portion of the panel splice 509 extends at least partially into a corresponding channel 507 in an immediately adjacent panel. In this manner, a portion of the panel splice 509 may protrude into channels 507 for both panels, with the panel splice 509 bridging a space between the panels. The portion protruding into each channel 507 may then be affixed to each panel (via each respective frame, for example) thereby aligning the panels, and providing rigidity and support to the panel array. A shelf 511 as depicted in FIG. 5 may be able to provide additional support and rigidity to the structure by preventing a slight dip or any other misalignment between adjacent panels.

Exemplary Fastening Device

Figure 6A:
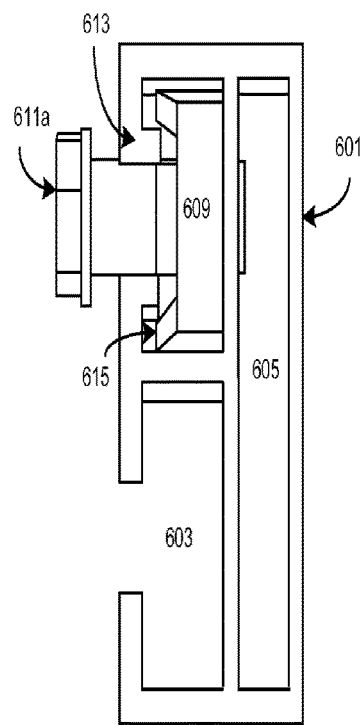
FIG. 6a depicts a cross-section of an exemplary panel frame and panel splice with a fastening mechanism in an unfastened alignment, in accordance with various embodiments of the claimed subject matter.
Figure 6B:
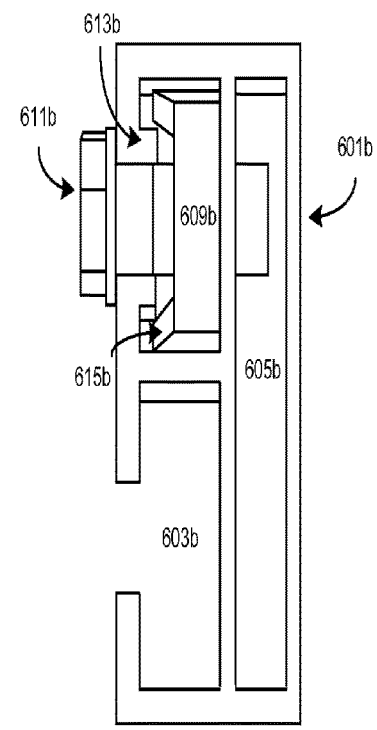
FIG. 6b depicts a cross-section of an exemplary panel frame and panel splice with a fastening mechanism in an fastened alignment, in accordance with various embodiments of the claimed subject matter.

FIGS. 6a and 6b depict cross-sections (600a, 600b) of an exemplary panel frame 601 and panel splice 609. Each of FIGS. 6a and 6b depict panel frames 601 in a three channel configuration, including a closed back channel 605, a lower, open front channel 603, and an upper open front channel (occupied by the splice 609). In one or more embodiments, one or more channels of a panel frame 601 may be equipped with securing features to allow the secure movement of a panel splice 609 along the channel. These features may include, for example a bolstered edge (613) that corresponds to a dovetail feature 615 of the panel splice 609. Such a configuration secures the splice within the channel while still allowing free movement along the channel.

FIG. 6a depicts an adjustable fastening mechanism 611a at a less secured position. FIG. 6b depicts the adjustable fastening mechanism 611b at a more secured position. While the claimed subject matter is well suited to other embodiments, the fastening mechanisms 611a and 611b are depicted in FIGS. 6a and 6b as bolts that are inserted through apertures in side surfaces of both the panel splice 609 and a wall in the back channel 605. Fastening the splice 609 into a current position may thus be performed by inserting the fastening mechanism into an initial position (e.g., 611a) and tightening the fastening mechanism to secure the splice 609 into place at a final position (e.g., 611b). While FIG. 6a depicts a side-oriented fastening embodiment, the apertures may also (or instead) be positioned on top surfaces of the panel splice 609 and frame 601a, 601b, such that the fastening device may be inserted through the apertures in the top surfaces and secured also from the top. Removal of top-fastened splices may be performed in these embodiments also from a position above the panels, thereby providing greater access to fastening mechanisms of installed panels arranged in tightly spaced, two-dimensional arrays.

Exemplary Integrated Electrical Connection Interfaces

Figure 7:
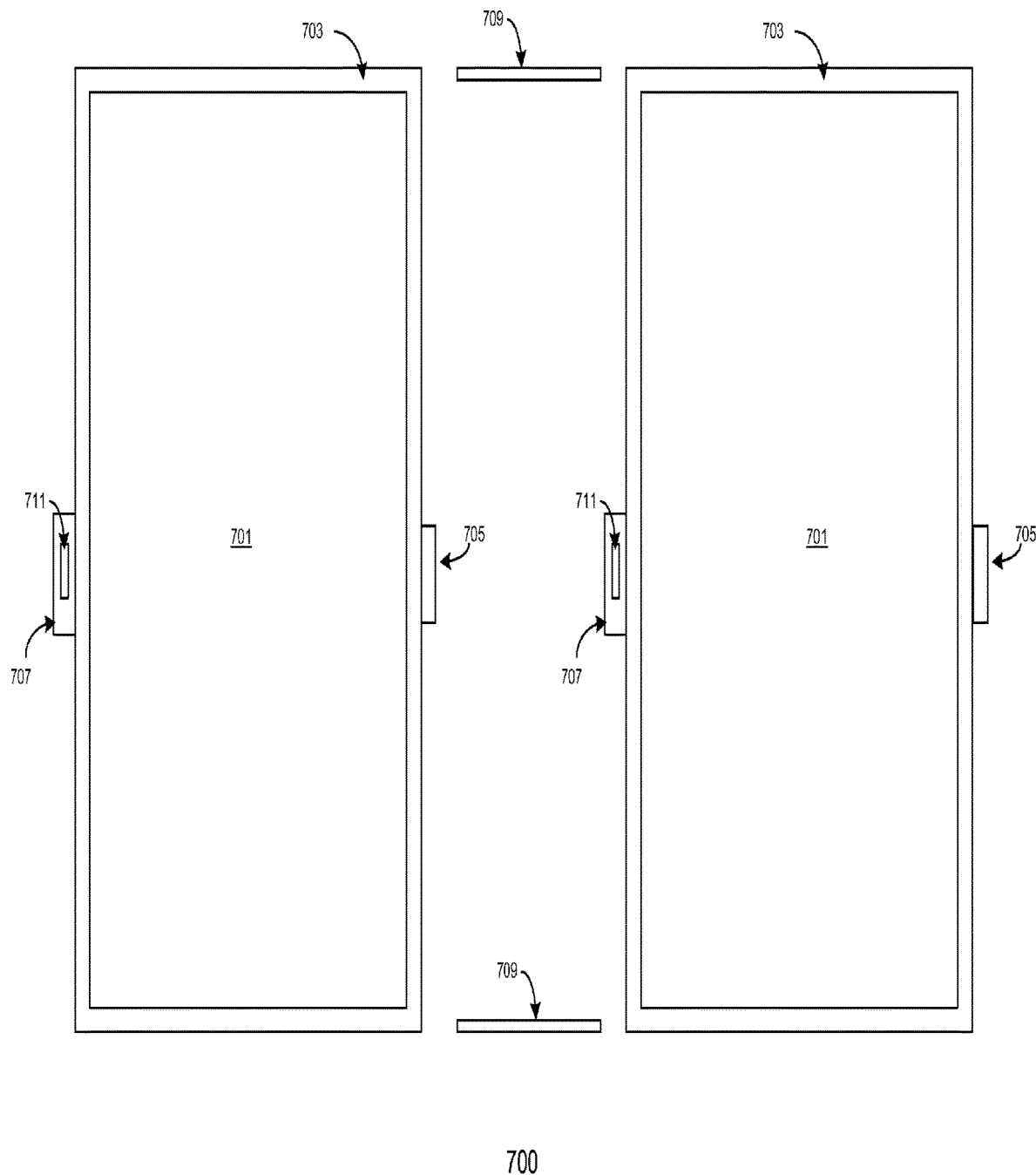
FIG. 7 depicts an exemplary illustration of a plurality of panels, in accordance with various embodiments of the claimed subject matter.

FIG. 7 depicts an exemplary illustration 700 of a plurality of panels (701), each panel having an encircling frame (703), in accordance with various embodiments of the claimed subject matter. The panels 701 may be mechanically coupled to each other with panel splices 709 positioned along channels in the top and bottom edges of the frames 703 surrounding the perimeters of the panels 701, as described above. As depicted in FIG. 7, each panel 701 includes a pair of integrated electrical connection interfaces. In one or more embodiments, the electrical connection interfaces may include a reception interface 705 configured to mechanically and electrically couple (via a plurality of pins, for example) with a connection interface 707. In one or more embodiments, coupling a reception interface 705 of a panel (e.g., 701) with the connection interface 707 of a neighboring panel (e.g., 703) establishes an electrical path between the panels, e.g., to conduct the flow of electricity along the configuration of panels.

As depicted in FIG. 7, each electrical connection interface may be positioned to protrude from a side surface of a panel frame, and such that the reception interface of a panel is on an opposite side surface of the connection interface. In this manner, the reception interface of a panel is always aligned to couple with a connection interface of a neighboring panel, and vice versa. By having an integrated electrical connection interface in the panels themselves, conventional approaches that require sub-surface wiring underneath the panel can be avoided, such that removal of panels may be performed more easily, with greater access to the electrical path, and with less risk of exposing or damaging wiring during removal procedures. The electrical connection may be disengaged by decoupling the reception interface 705 from the connection interface 707.

In one or more embodiments, disengagement of the electrical connection interfaces may be performed using a release feature 711. The release feature may, in some embodiments, be implemented to include a mechanical release of one or more engagement features used to couple the electrical connection interfaces together. The engagement features may, in some instances, be implemented as: a spring action element; a clasping element; a latch element; a twist element; and/or a cam element, each of which, when the mechanical release is activated, releases the engagement between the connection interface 707 and the reception interface 705. In one or more embodiments, the release feature 711 may be activated by hand (e.g., toggling a button or lever). In further embodiments, the release feature 711 may be activated with a general or specialized tool.

Figure 8:
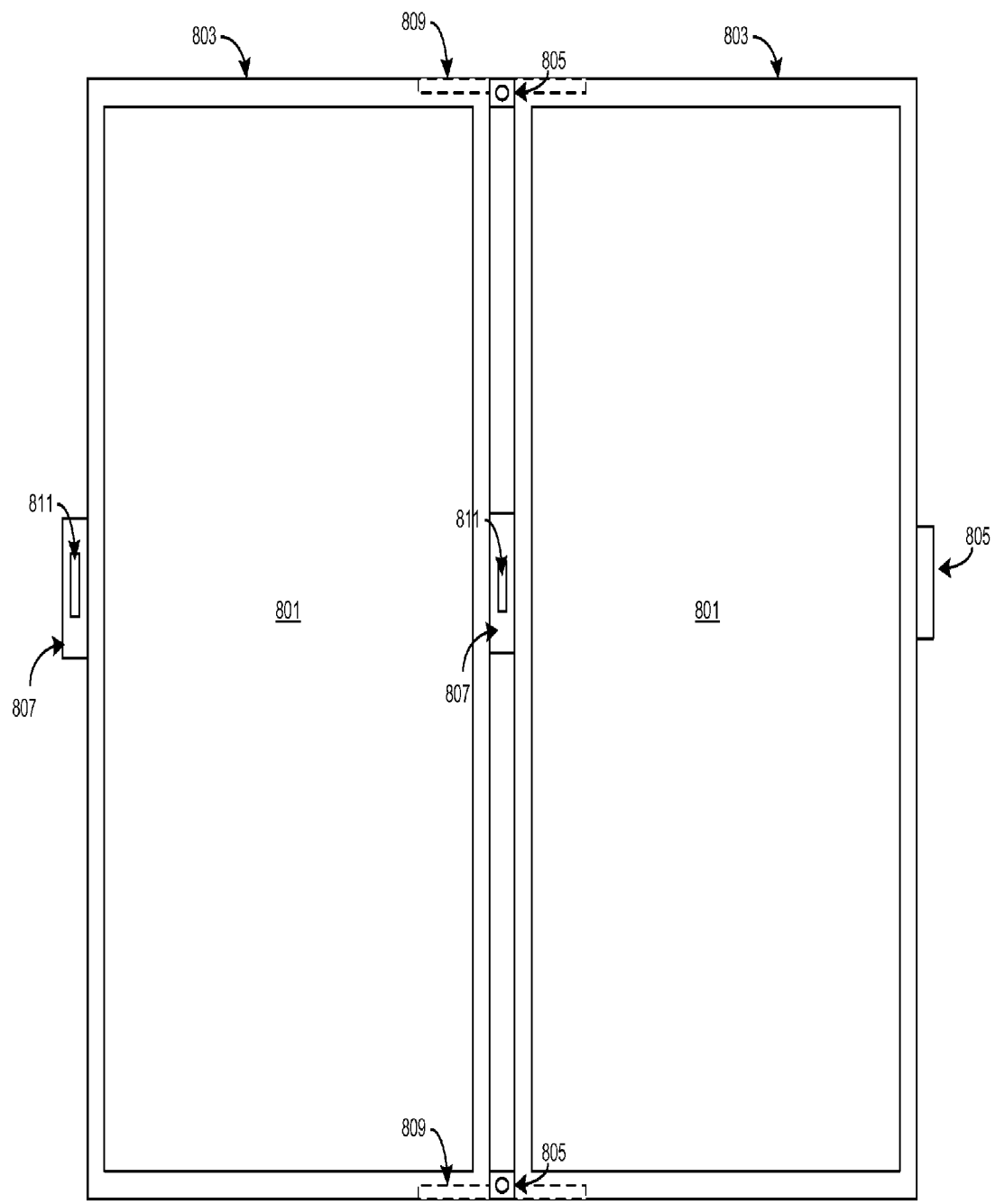
FIG. 8 depicts an exemplary illustration of a plurality of panels mechanically coupled by a plurality of splices, in accordance with various embodiments of the claimed subject matter.

FIG. 8 depicts an exemplary illustration 800 of a plurality of coupled panels (801), each panel having an encircling frame (803), in accordance with various embodiments of the claimed subject matter. As depicted in FIG. 8, the panels 801 correspond to the panels 701 described above with respect to FIG. 7. The panels 801 are depicted in a coupled state, whereby a pair of panel splices 809 are positioned in channels along the top and bottom edges of the frames 803, and affixed to the frame. As depicted in FIG. 8, a roughly equivalent proportion of each splice may extend into a channel of each panel. The splices may be affixed to the frames via fastening mechanisms along the top and/or side surfaces, as variously described herein.

In one or more embodiments, spacer components 805 may be placed between panels, in order to provide a clearance between the pair of adjacent panels 801 and to allow access to a release feature 811 of an electrical connection 807. In one or more embodiments, the spacer components 805 may be implemented to include a channel, aligned with the one or more channels of the panel frames 803, and configured to allow a panel splice 809 to travel through the spacer channel. In other words, the spacer channel may act as a channel bridge in the space between the panels. Particular implementations of the spacer components 805 can vary widely across embodiments. These implementations may include, but are not limited to: a clamp; a washer; a bolt; a shelf; a full or partial cross-section of a frame; or any such component configured to align against an exterior (outwardly facing) surface of a frame 803 of a panel 801 and to provide a clearance between two adjacent panels 801.

In one or more embodiments, the panel splices 809 may be fastened to a desired position through the spacer components 805. For example, a fastening mechanism (such as fastening mechanism 611a, 611b described above with respect to FIGS. 6a and 6b) may be fastened to the panel splice 809 through an aperture in the top or side surface of the spacer component 805. In alternate embodiments, tightening of the fastening mechanism may be performed through an aperture in the panel splice 809, with the fastening mechanism gaining access to contact the panel splice 809 through an aperture in the top or side surface of the spacer component 805. According to such embodiments, the fastening mechanism may or may not itself be fastened to the spacer component 805.

Figure 9:
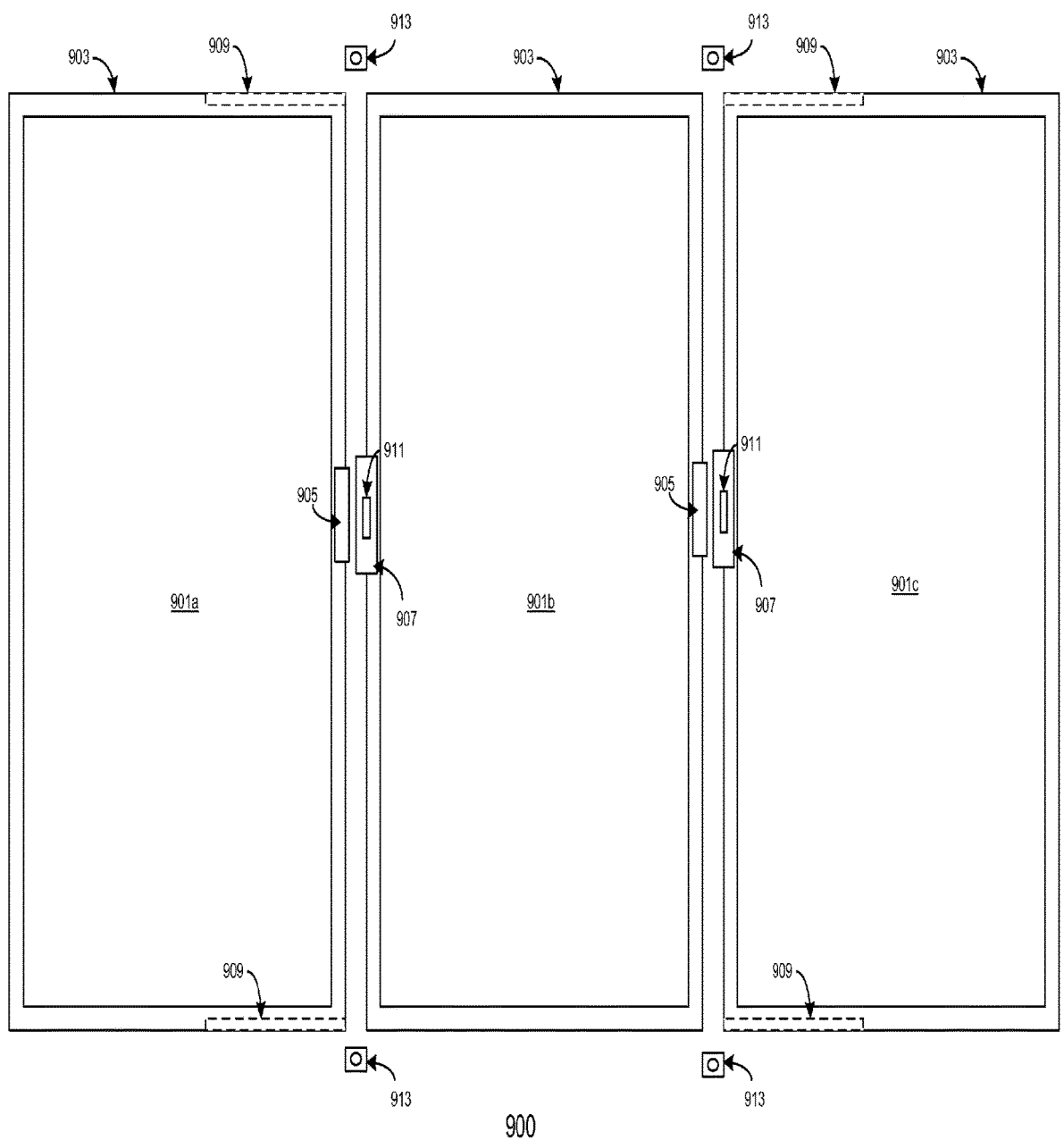
FIG. 9 depicts an exemplary illustration of a plurality of decoupled panel, in accordance with various embodiments of the claimed subject matter.

FIG. 9 depicts an exemplary illustration 900 during the removal of a middle panel of a sequence of three panels (901a, 901b, 901c), in accordance with various embodiments of the claimed subject matter. As depicted in FIG. 9, each panel has an encircling frame (903). As depicted in FIG. 9, the panels 901a, 901b, 901c correspond to the panels 701 and 801 described above with respect to FIGS. 7 and 8. As shown in FIG. 9, panel 901b may be removed by unfastening the panel splices 909 and moving (sliding) the panel splices 909 out of the channels in the frame 903 of the target panel 901b. Unfastening the panel splices 909 may be performed by removing or deactivating a fastening mechanism used to affix the panel splice 909 to a frame 903 and/or a spacer component 913. For example, a bolt may be loosened through an aperture in either the side or top surface of a panel splice 909 and at least one of a frame 903 and a spacer 913 the panel splice 909 is affixed to.

In one or more embodiments, the panel splices 909 may be moved further into the channels of the adjacent panels 901a, 901c, such that an entirety or a substantial portion of each panel splice 909 is in the neighboring panels, with little to no portion of the splice remaining in the panel 901b to be removed. In one or more embodiments, the panel splices 909 may be moved through the spacer components 913 with sufficient clearance as to allow the removal of the spacer components 913 from between the panels. In still further embodiments, a spacer component 913 may be removed (e.g., by removing a top-oriented fastening mechanism) without disturbing the placement of the panels on either side of the spacer component 913.

Panel Installation

Figure 10:
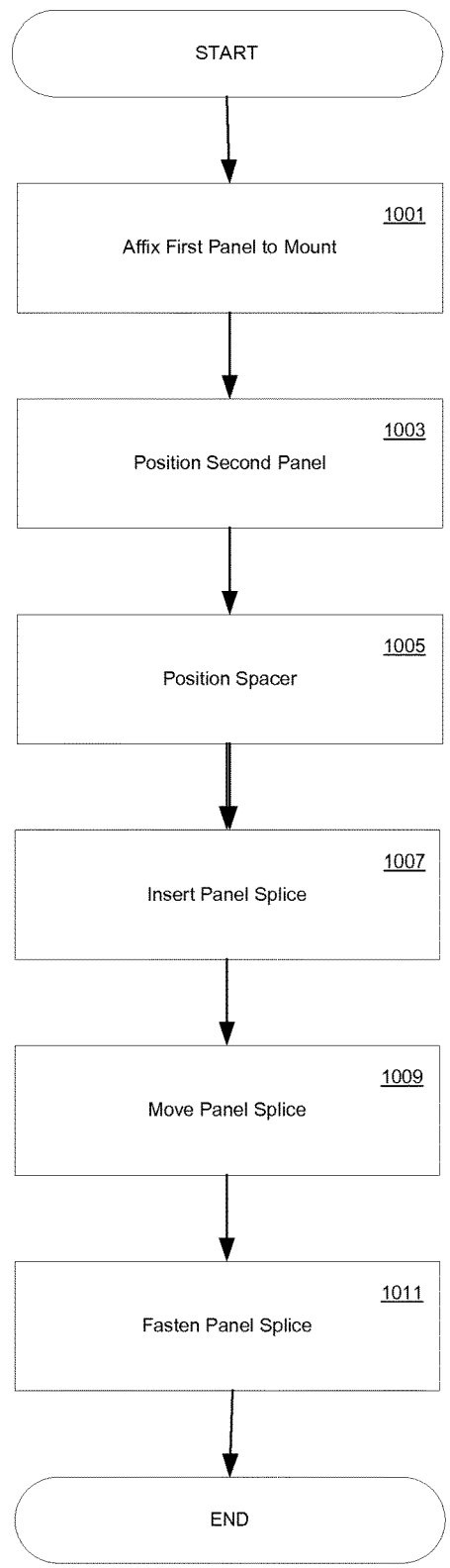
FIG. 10 depicts a flowchart of an exemplary process for coupling a plurality of panels, in accordance with various embodiments of the claimed subject matter.

FIG. 10 depicts a flowchart of an exemplary process 1000 for coupling a plurality of panels. Steps 1001-1011 describe exemplary steps comprising the process 1000 in accordance with the various embodiments herein described.

At step 1001, a panel is affixed to a mounting system. Affixing the panel to a mount may be performed by, for example, fastening a mounting point against a frame of the panel, and to the mounting system itself. According to various embodiments, the mounting point may be configured to freely travel a length of a side of the frame of the panel within a first channel or groove in the frame until a desired position is reached. The mounting point may then be fastened against the frame to secure the panel to the mounting system.

At step 1003, a second panel is positioned next to the panel affixed to the mounting system. The second panel may be positioned linearly in a serial alignment with respect to the first panel, as part of a one or two dimensional array of panels, for example. Once positioned, a spacer is positioned between the two panels (step 1005). In one embodiment, the spacer is positioned to align with the exterior surface of the frames of the adjacent panels along the edge of one side of the frames. A panel splice is then inserted into a second channel of one of the panels at step 1007. According to alternate embodiments, the panel splice may be inserted into a second channel of the first panel prior to the positioning of the second panel at step 1003.

Once the panel splice is inserted into a second channel in the frame of either the first or second panel, the panel splice can be moved along the second channel of one or both panel frames and the spacer at step 1009 until a target position is reached. In one embodiment, the target position is achieved when the panel splice extends into the second channel of both panel frames in substantially equivalent proportion. In further embodiments, bumps, spring-pins or other guiding elements (with corresponding apertures, grooves) may be used to guide the panel splice into proper positioning, indicate the splice is in the correct position, and further secure the splice in place. Once the target position of the splice is achieved, the splice can be fastened at step 1011, e.g., via a fastening mechanism through a side and/or top surface of the splice, whereby the splice is affixed into its present position and to the spacer, at least one of the pair of adjacent panels, or any combination thereof.

Steps 1005 to 1011 are then repeated for an opposite edge of the pair of adjacent panels, whereby a second spacer is inserted between the panels, a second splice is inserted, positioned, and fastened into a target position. In further embodiments, each panel may further include an electrical connection interface that is configured to electrically and physically couple when a pair of adjacent panels are positioned and aligned. In one embodiment, positioning the splice at the target position (e.g., step 1009) aligns the panels, and may position the electrical connection interfaces of each panel to automatically couple. In further embodiments, the alignment of the panels provided by the splice also prevents terminals (e.g., pins) of the interface from being damaged. Once splices on both opposite edges are fastened into position, and the electrical connection interfaces between the pair of panels is engaged, installation is completed for that pair of panels. A next panel in the series can be installed, adjacent to the second panel, by performing steps 1003 to 1011 for the panel, and for each subsequent panel in the series.

Panel Removal

Figure 11:
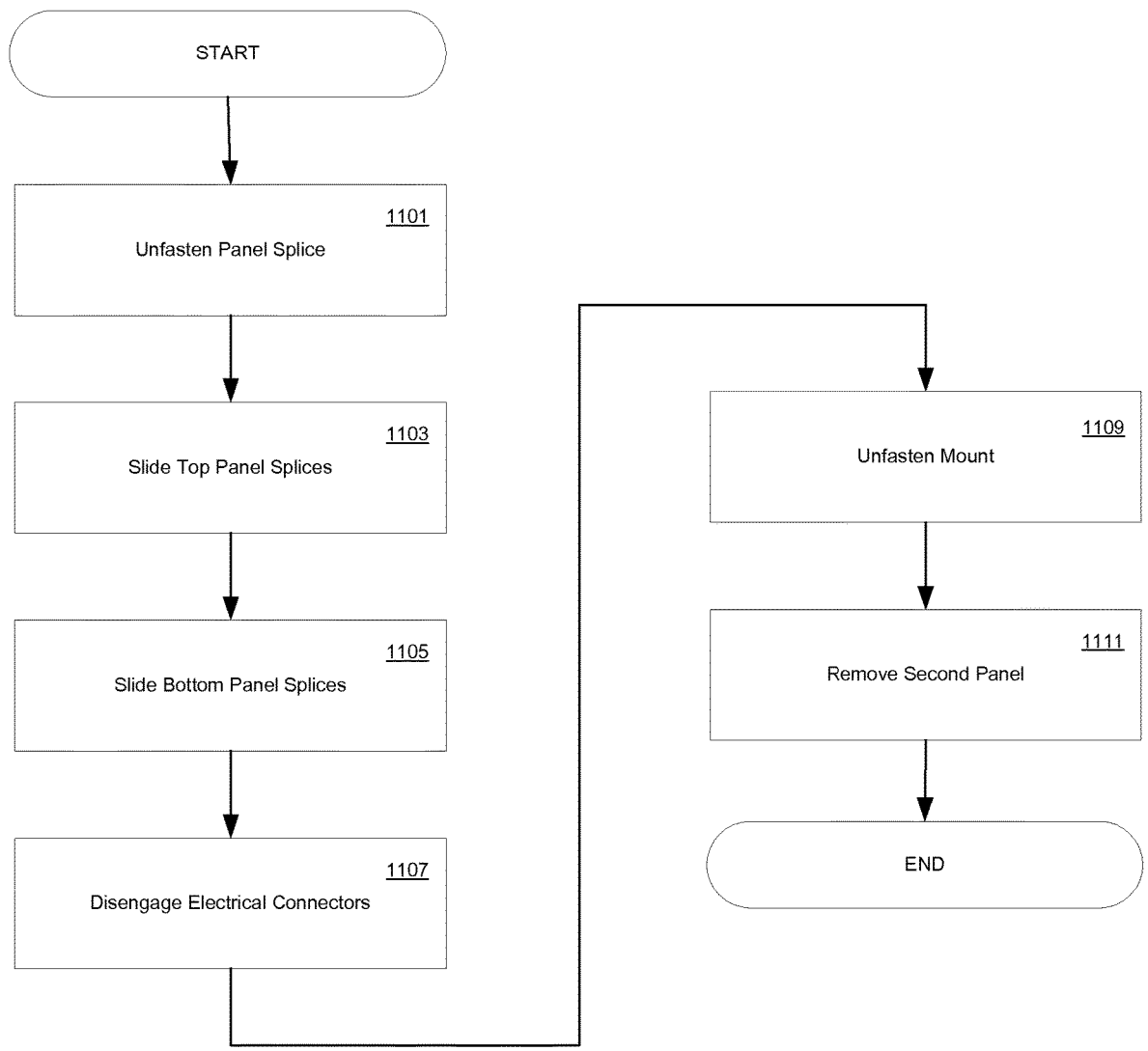
FIG. 11 depicts a flowchart of an exemplary process for removing a panel between a plurality of adjacent panels, in accordance with various embodiments of the claimed subject matter.

FIG. 11 depicts a flowchart of an exemplary process for removing a panel between a plurality of adjacent panels, in accordance with various embodiments of the claimed subject matter. Steps 1101-1011 describe exemplary steps comprising the process 1000 in accordance with the various embodiments herein described.

At step 1101, panel splices are unfastened for a target panel between a pair of panels, with a panel being located on either side of the target panel. Panel splices may be unfastened by loosening (and/or removing) a fastening mechanism affixing the splices to the frame of target panel and each of the two neighboring panels. At step 1103, the splices along a top edge of the panels are moved in a channel along the frames of each of the target panel and the two neighboring panels such that no (substantial) portion of any splice remains in the channels of the target panel. This may be performed by, for example, shifting the splice so that an entirety or substantial majority of the splice extends into the channels of the neighboring panels, and away from the channel of the target panel. Movement of the splices is repeated at step 1105 for the splices in the channels along the bottom edge of the panels.

Once the splices are completely disengaged from the target panel along both the top and bottom edge, electrical connectors coupling the target panel to electrical connectors in each of its neighboring panels are also disengaged at step 1107. Disengaging the electrical connectors may be performed, for example, by activating a release element in the electrical connector that automatically releases, or allows a manual separation of the electrical interfaces coupled together to form the electrical connection. At step 1109, the target panel is unfastened from the mounting system (if necessary), by detaching or unfastening the target panel from a mounting point. Thereafter, the target panel is no longer attached to either of the adjacent panels mechanically or electrically, and any attachment to the mounting system is removed as well. Finally, the target panel may be removed at step 1111.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An installation system for a plurality of panels, the system comprising:
   a plurality of panels, each panel of the plurality of panels comprising:

a frame encircling a perimeter of the each panel; and
a frame channel disposed along the frame; and
a plurality of fastening assemblies, each including a splice and a spacer component, the splice being positioned within the frame channels of a pair of adjacent panels of the plurality of panels, the spacer component including a spacer body positioned between the pair of adjacent panels, the spacer body including a spacer channel passing through the body and aligned with the frame channels of both panels of the pair of adjacent panels and bridging a width of the spacer component between the pair of adjacent panels, the splice being slidable through the spacer channel and extending through the spacer channel having the spacer component positioned between the panels of the pair of adjacent panels;

wherein:
the frame of each panel of the plurality of panels includes a first edge, a second edge, a third edge, and a fourth edge, the first edge and the second edge being positioned opposite one another, the third edge and the fourth edge being positioned opposite one another, the third edge extending between the first edge and the second edge, the fourth edge extending between the first edge and the second edge;
the splice is positioned within the frame channels in the first edges of the pair of adjacent panels of the plurality of panels having the fourth edge of a first panel of the pair of adjacent panels and the third edge of a second panel of the pair of adjacent panels facing one another and defining a gap, the spacer body being positioned within the gap having the spacer channel aligned with the frame channels in the first edges of the pair of adjacent panels.

2. The system according to claim 1, wherein the spacer component of each fastening assembly provides a surface against which to tighten the pair of adjacent panels.

3. The system according to claim 1, wherein the spacer component is removable from a position between the frames of the pair of adjacent panels without removing either of the pair of adjacent panels.

4. The system according to claim 1, wherein the spacer component comprises at least one from the group consisting of:
  a clamp;
  a washer;
  a bolt;
  a shelf;
  a full cross-section matching the frames of the adjacent panels;
  a partial cross-section matching the frames of the adjacent panels; and
  a component configured to align against exterior surfaces of the frames of the two adjacent panels to provide clearance between two adjacent panels of the plurality of panels.

5. The system according to claim 1, wherein the spacer component includes an aperture, further wherein a fastening device is configured to be inserted through the aperture and secure to the splice.

6. The system according to claim 5, wherein the fastening device comprises at least one fastening device from the group comprising:
  a spring loaded pin;
  a bolt;
  a cam device;
  a screw;
  an interference fit fastener;
  a threaded fastener;
  a tapered threaded fastener;
  a cone threaded fastener;
  a ball-tipped fastener;
  a spring loaded fastener;
  a pin; and
  a tapered spring fastener.

7. The system according to claim 1, wherein the frame channel comprises a securing mechanism configured to secure the splice during movement of the splice along the frame channel.

8. The system according to claim 7, wherein the securing mechanism comprises at least one of:
  a bolstered channel in the frame channel; and
  a dovetail groove disposed on the second panel splice.

9. The system according to claim 1, wherein at least one of the spacer component and the splice are positioned between the pair of adjacent panels operable to provide a grounding path for the pair of adjacent panels.

10. The system according to claim 1, wherein the splice comprises at least one from the group consisting of:
  a plate;
  a rod;
  a slider;
  a beam;
  a bolt;
  an arch;
  a polyhedral extension; and
  a stamped and bent metal plate.

11. The system according to claim 1, wherein the splice comprises a friction-reducing element, the friction-reducing element comprising at least one from the group comprising:
  a surface finish;
  a surface coating;
  a surface plating;
  a plurality of surface grooves;
  a plurality of raised elements;
  an embossing;
  an encasing in a low friction polymer;
  a low friction tape.

12. The installation system of claim 1, wherein the splice is slidable through the spacer and into the frame channel of the first panel of the pair of adjacent panels such that no portion of the splice extends into the frame channel of the second panel of the pair of adjacent panels.

13. The installation system of claim 12, wherein the splice is a first splice and the spacer component is a first spacer component, the system further comprising:
  a second splice such that the second splice extends into the frame channels in the second edges of the first and second panels when the first splice is positioned in the frame channels in the first edges of the first and second panels; and
  a second spacer component positioned in the gap having the second splice passing through a spacer channel of the second spacer component.

* * * * *